Figure 1:
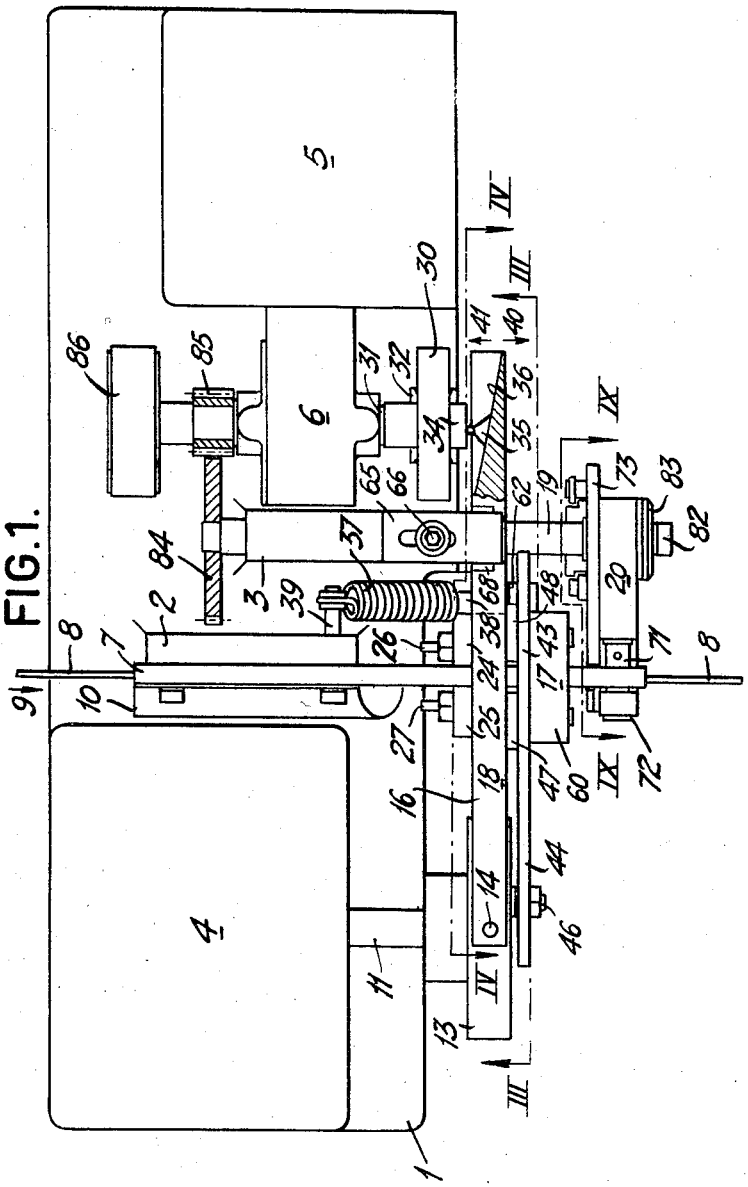

May 10, 1960  K. G. ÖSTBERG  2,935,902
DEVICE FOR THE MANUFACTURE OF SAW BLADES
Filed May 28, 1957  6 Sheets-Sheet 1

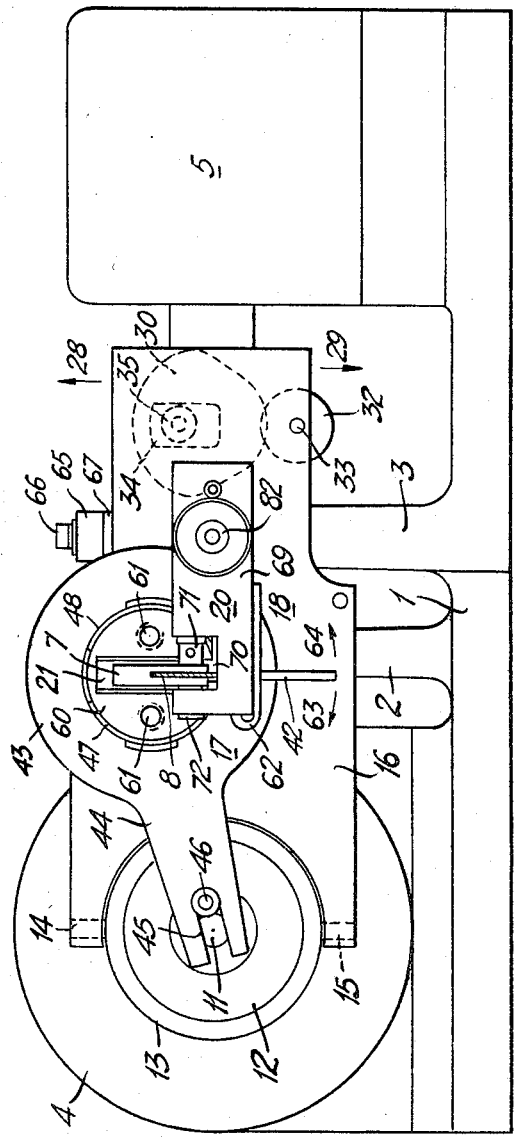

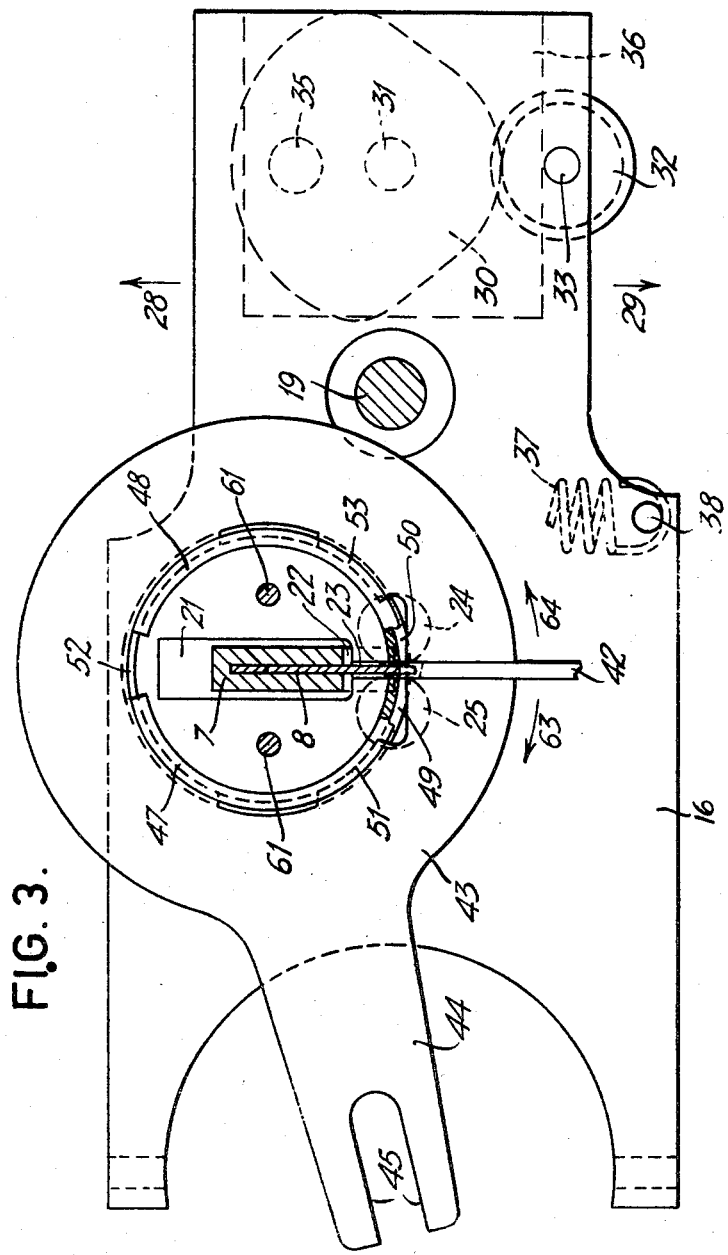

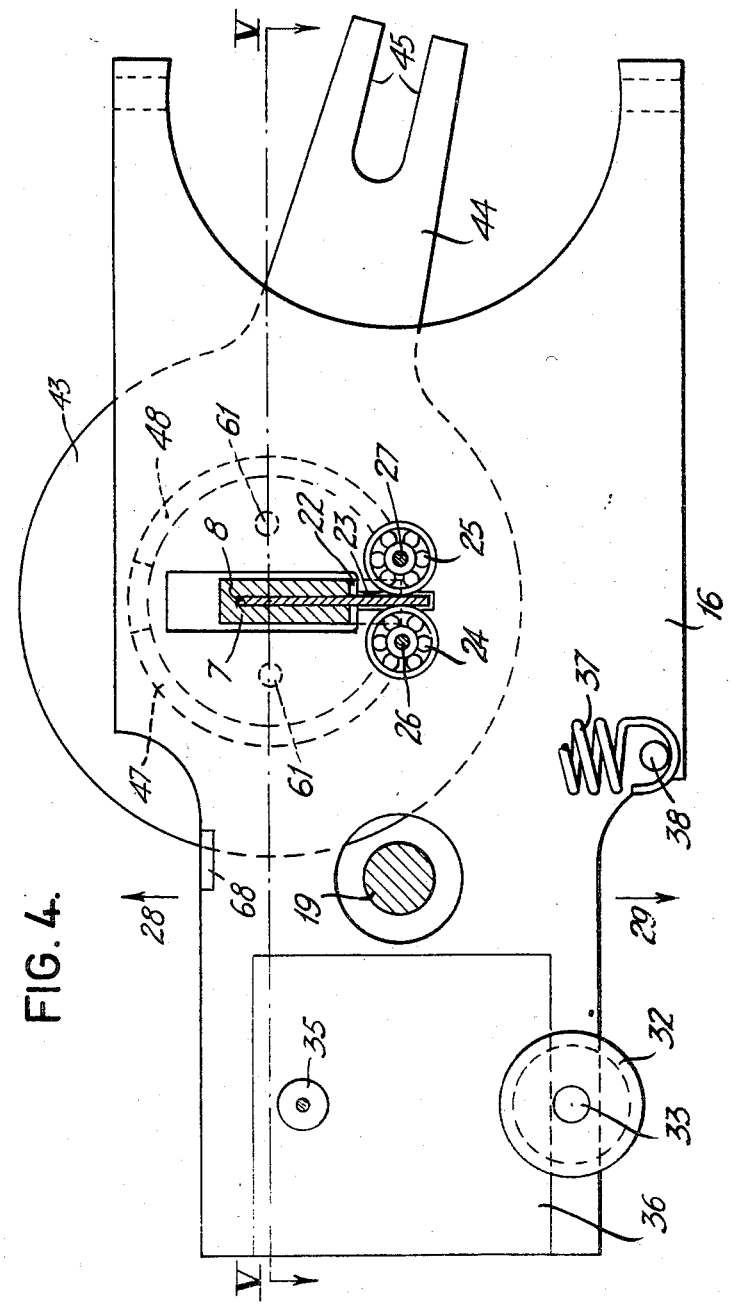

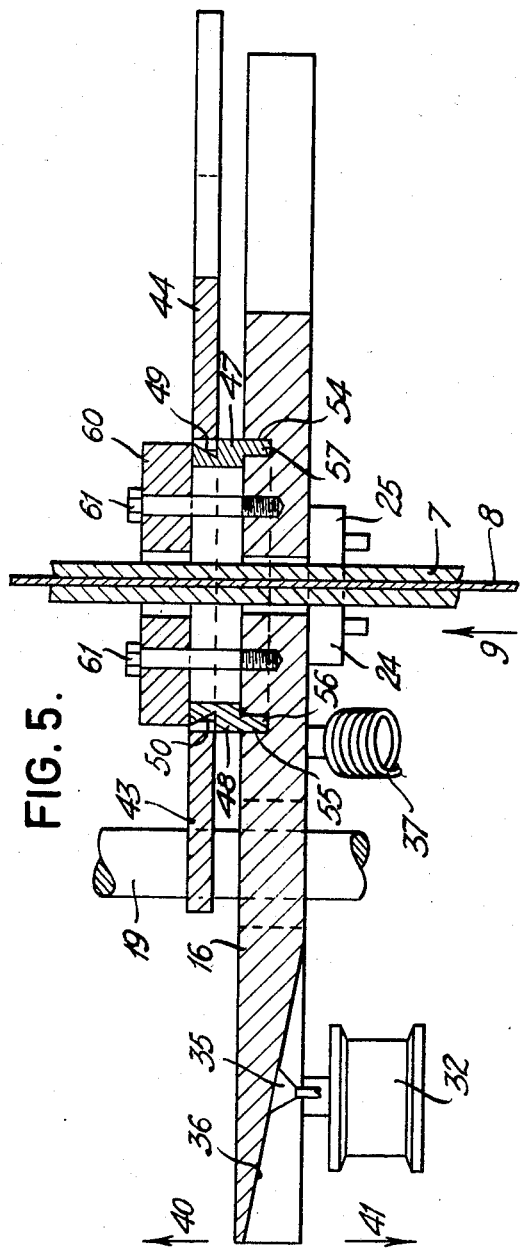

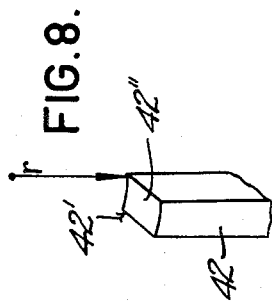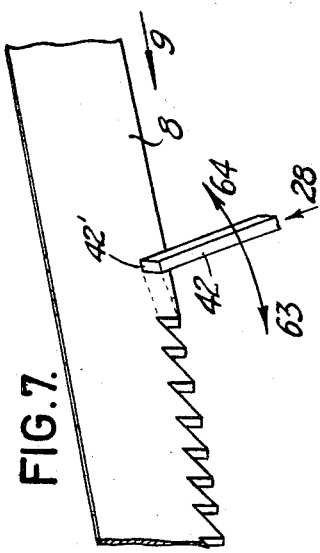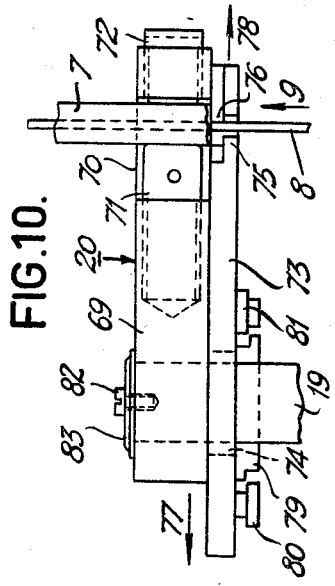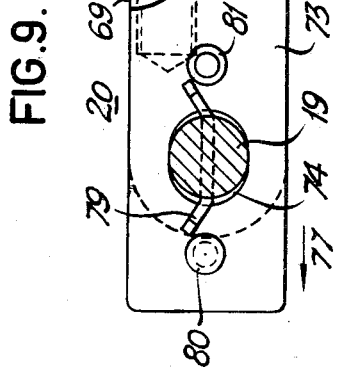

United States Patent Office 2,935,902
Patented May 10, 1960

2,935,902
DEVICE FOR THE MANUFACTURE OF SAW BLADES

Karl Gustaf Östberg, Stockholm, Sweden

Application May 28, 1957, Serial No. 662,242

Claims priority, application Sweden May 31, 1956

10 Claims. (Cl. 76—25)

The present invention concerns a device for the manufacture of saw blades and is chiefly characterized in that the blank for the saw blade is adapted to be machined by a punching, shearing or cutting tool for providing the tooth gaps, the tool or the blank being adapted to perform during a successive machining operation in part a reciprocating working movement transversely to the longitudinal direction of the blank and to the plane of the blade, and in part a feeding movement transversely to the longitudinal direction of the blank.

The blank for the saw blade is preferably adapted to be fed during the machining interval, the feed thus taking place intermittently. The saw teeth thus formed are adapted to be set during the period of standing still of the blank by means of a setting tool connected to the device and timed to the same.

In order to disclose the invention more clearly an embodiment of the same will be described below with reference to the attached drawings, in which Figure 1 shows a top plan view of the device;
Figure 2 shows a front elevation of the device;
Figure 3 is a section along line III—III of Fig. 1;
Figure 4 is a section along line IV—IV of Fig. 1;
Figure 5 is a section along line V—V of Fig. 4;
Figure 6 shows, in perspective, rings laterally supporting the blank for the saw blade;
Figures 7 and 8 are explicative figures illustrating the way of operation of the tool; and
Figures 9 and 10 show the setting tool seen from the side and from the top, respectively, in sections along line IX—IX of Fig. 1.

The device comprises a base plate 1 provided with two stand portions 2 and 3. The base plate carries two motors 4 and 5 of which the motor 5 is provided with a reduction gear 6. The stand portion 2 carries a guide channel 7 for the blank 8 which in the device illustrated is fed in the direction as indicated by arrow 9. For adjustment due to various dimensions of the blank it is advisable to insert spacing strips in the guide channel. At the admission end of the guide channel 7 a member 10 backing the blank is fitted. A ball bearing 12 carrying an outer ring 13 is affixed to the shaft 11 of the motor 4. The ring 13 is provided with two pivots 14 and 15 diametrically opposed and on which an arm 16 carrying the tooling mechanism 17 is pivotally carried, said arm constituting a part of the feeding mechanism, generally designated by 18. The stand portion 3 constitutes the bearing of a shaft 19 which actuates and in part carries the setting tool 20.

Before describing the tooling mechanism and its movements more in detail an account shall be given of the feeding mechanism, as the movements of the last mentioned mechanism partly affects the movements of the tool in relationship to the saw blade blank.

As stated, the arm 16 is pivotally carried on the pivots 14, 15 and rotatable about the ball bearing in a plane perpendicular to the first plane of turning. As will be clearly evident from Figure 4, the arm 16 is provided with an opening 21 for the guide channel 7, the latter having at its lower part a recess 22 so as to lay bare the lower part of the blank when this passes through the narrower bottom section 23 of the opening 21 in the arm 16. On one side of the arm two ball bearings 24 and 25 are arranged on either side of the opening 23. These bearings are fitted on studs 26 and 27, respectively, which are eccentrically carried so that the ball bearings can be brought towards or away from each other. The ball bearings must be so adjusted in relationship to one another that when the arm is swung in the direction as indicated by arrow 28, the bearings shall roll on to both side surfaces of the blank, transversely to the same, and pinch the blank between themselves. If the arm now is turned about the pivots 14 and 15, the saw blade blank will be brought along in the direction of movement of the arm, as the turning of the arm takes place in a plane which is perpendicular to the plane of rotation of the bearings 24, 25. After the advancing of the blank has been completed, the arm is turned in the direction as indicated by arrow 29, the ball bearings then rolling out of engagement with the blank. In order to provide these movements, the free end of the arm is connected with an eccentric device comprising a cam disc or eccentric 30 which is fitted to the shaft 31 extending from the gear housing 6 of the motor 5. This eccentric is arranged to coact with a roller 32 which is carried on a pin 33 affixed to the arm 16 and being slidable axially. On that side of the eccentric which is facing the arm 16 there is a projecting portion 34 carrying a ball-joint-like bearing for a slipper 35 which is adapted to slide along a beveled surface 36 forming an oblique angle with the longitudinal direction of the arm 16. In order to hold the oblique surface 36 of the arm into engagement with the slipper 35, and the roller 32 into engagement with the eccentric 30, a coil spring 37 is disposed between a bolt 38 attached to the lower part of the arm and a stud member 39 attached to the upper part of the stand portion 2, the spring 37 thus forming an inclined angle with the arm 16. By the rotation of the eccentric 30 the aforementioned movements in the directions of arrows 28 and 29 are effected, that is, in those directions in which the ball bearings 24 and 25 roll into and out of engagement with the saw blade blank. The above mentioned slipper 35 and the oblique surface coating with the same have for their purpose to provide the feeding movement itself. Hence, when the slipper moves towards the inner parts of the arm during the rotation of the eccentric 30, the arm will move in the direction as indicated by arrow 40 and as the rotation continues, that is, when the slipper moves towards the outer end of the arm, the arm will travel in the direction as indicated by arrow 41. Thus the slipper 35 and the surface 36 form still another eccentric device operating in a plane perpendicular to the eccentric 30. The two eccentric movements are co-ordinated in such a manner that the arm will first move in the direction of arrow 28, the ball bearings then rolling on to the side edges of the blank. During this movement the slipper 35 moves along the outer portion of the surface 36, the arm 16 substantially standing still as viewed in the feeding direction of the blank. During the continued rotation of the eccentric 30 the slipper will move towards the inner parts of the arm, the latter then traveling in the direction of arrow 40 and feeding the blank. After this the slipper enters the inner portions of the surface 36 in which the eccentric 30 actuates the arm in the direction of arrow 29, the ball bearings 24, 25 then rolling out of engagement with the blank 8. The arm is then restored to the starting point and during this whole movement the ball bearings will be out of engagement with the blank. Hence, the path of movement which the arm runs through is substantially rectangular.

As stated before, the arm 16 also carries the tooling mechanism 17 itself which comprises a disc 43 carrying the tool 42 and having an arm 44 which at its free end is shaped as a fork 45 adapted to coact with a crank pin 46 fitted eccentrically to the shaft 11. The disc 43 is journaled on two guide rings 47 and 48 and, more exactly stated, in grooves 49 and 50, respectively, of the same (see particularly Figures 5 and 6) by means of tongues 51, 52 and 53 projecting from the disc 43 into the grooves. The guide rings 47 and 48 are slidably carried in grooves 54 and 55, respectively, by means of edges 56 and 57, respectively, projecting into the grooves. The grooves 49 and 50 have a cross section shaped in correspondence with the tooth gaps to be cut. The end faces 58 and 59, respectively, of the guide rings (Figure 6) are moved into engagement with the blank 8 so as to constitute a lateral support of the same. The upper portion 42' of the tool 42 is adapted to slide in the grooves 49 and 50, this portion as well having an outline corresponding to the shape of the tooth gaps to be formed. In order to retain the guide rings in the position set, a block 60 is pressed to abutment against the outer surface of the guide rings by means of bolts 61 threaded to the arm 16. A clamping device 62 for the tool 42 is indicated in Figures 1 and 2, said device being omitted, however, in Figures 3 and 4, for convenience in illustration.

By the oscillating movement which is imparted to the disc 43 through the crank pin connection 45, 46 the tool 42 will reciprocate in the directions as indicated by arrows 63 and 64. From Figure 7 there will be seen more clearly how the machining itself is carried out. Here the blank 8 is shown detached together with the tool 42. As mentioned before the upper portion 42' of the tool has an outline corresponding to the shape of the tooth gaps to be cut. The tool is moved laterally against the side surface of the blank by means of the disc 43. Hence, the tooth gap will be sheared from the blank in a punching-like operation. Such a shearing can be carried out in a movement towards the saw blade blank in the directions of either arrow 63 or arrow 64. However, shearing of the entire tooth gap in one single tool stroke would involve too high a stress on the tool and too poor edge surfaces after shearing, for which reason it is more advisable to cause the tip of the tool first to strike the blank in one swing movement and to feed the tool towards the blank during the subsequent movements until the desired size of the tooth gap is obtained. Hereby only small portions of the blank will will be cut in each oscillation of the tool. The tool should perform a considerable number of working strokes per unit of length machined. (In practice the speed is about 1500 oscillations per minute.) This successive feed of the tool is accomplished by moving the arm 16 in the direction of arrow 28, that is, at the same time as the ball bearings 24, 25 roll on to the side surfaces of the blank, the tool cuts its way into the blank, the spring 37 giving motive power vertically to the tool. In order to adjust the depth to which the tool advances into the saw blade blank, that is, to adjust the size of the tooth gap, a stop shoulder 65 is disposed on the top side of the stand portion 3, said shoulder being adjustable lengthwise by means of a bolt fastening device 66. The stop shoulder is provided on the underside with a beveled surface 67 which is adapted to coact with a beveled surface 68 on the arm 16. By moving the stop shoulder so as to project more or less over the arm 16, the stroke of the arm in the direction of arrow 28 can be limited and thence the depth to which the tool 42 advances into the blank, so that the proper size of the tooth gap is obtained. By the cooperation of the two oblique surfaces 67 and 68 the movements of the arm in the directions of arrows 28 and 40 will proceed simultaneously, the eccentric 30 during this period of rotation not being in contact with the rolling surface of the roller 32 due to the limited stroke in the direction of arrow 28. When the arm travels in the direction of arrow 29, the tool 42 is moved out of the tooth gap thus formed and will not come into contact with the blank until the arm 16 again moves in the direction of arrow 28. Hence, the blank is fed during the very machining, but it does not move longitudinally in relationship to the tool, but the latter only moves transversely to the blank.

In designing the tip portion 42' of the tool in practice (see Figure 8) the beveled surface 42" should also be curved with a radius equal to the distance from the center of rotation of the disc 43 to said surface in order to fit snugly in the grooves 49 and 50.

After the saw teeth being produced in the tooling mechanism 17 the saw blade is fed on towards the setting device 20. This comprises a block 69 in which the shaft 19 is carried, said shaft partly supporting said block. The block has a recess 70 through which the guide channel 7 extends. The block can be secured to the guide channel by means of two set screws 71 and 72. On that side of the block which is facing the tooling mechanism a plate 73 is slidably disposed. This plate is slidably carried on the shaft 19 by the latter passing through an oblong opening 74. That part of the plate 73 which is positioned opposite the saw blade 8 is shaped so as to form two setting punches 75 and 76. These punches are offset a certain distance in relationship to each other longitudinally to the saw blade, said distance being equal to the distance between two teeth. If the plate is displaced in the direction as indicated by arrow 77 that tooth is set which is located opposite the punch 76, the setting being performed in the direction of said arrow; and if the plate is displaced in the direction of arrow 78, that tooth which is located opposite the punch 75 is set in the direction of the last mentioned arrow. The movements in said directions are imparted to the plate 73 by means of a cam device 79 cooperating with two pins 80 and 81 affixed to the plate. As will become evident upon viewing the drawing, (especially Figure 10) the pins 80 and 81 are stepped in order to coact with the cam device 79 which is shaped correspondingly. By this adaption each pin will only be actuated once per revolution of the shaft 19. As will be seen from Figure 9, the ends of the cam device 79 are positioned angularly to each other, which means that as soon as one pin, for instance 80, has been actuated and moved the plate in the direction as indicated by arrow 77, the second pin will be actuated immediately thereafter and will move the plate in the direction as indicated by arrow 78. Hence, two adjacent teeth will be set immediately after one another. A spring or the like (not shown) is preferably arranged for restoring the plate to its neutral position so that the punch will not damage the teeth during the feeding of the saw blade. In order to maintain the plate 73 in engagement with the block 69 and in order to retain these members in one and the same position on the shaft 19, a screw bolt 82 with a washer 83 is disposed on the end of the shaft, the plate and the block being held between the cam device 79 and the washer 83. The opposite end of the shaft 19 is provided with a gear 84 meshing with a gear 85 on the other end of the shaft 31. The gear ratio between said gears is selected in such a way, and they are so adjusted in relationship to each other, that every third tooth will remain unset, and the setting will take place during those intervals of the movement when the arm 16 is traveling in the direction of arrow 41, that is, when the saw blade stands still. The gear wheel 85 is so wide that it permits the shaft 19 to be axially displaced which is necessary in order to enable the proper adjustment of the setting tool in relation to the saw blade. A hand wheel 86 is fitted on the shaft 31 at the side of the gear 85 for manual operation of the driving mechanism during adjustment and the like.

The object of the present invention is very well suited to the production of saw bands, the blank for the same being fed continuously through the machine from a magazine roll.

Within the scope of the invention many variants may be contemplated. For instance, the eccentric device providing the feed movements may be designed in suitable ways differing from those illustrated. The tool can also be considered as performing a rectilinear operating movement instead of an oscillating one as shown. If deemed necessary, the setting tool can be omitted or constitute a completely separate unit. The feeding and the cutting mechanism need not be assembled, as shown. It is also conceivable that a device according to the invention can be designed in such a manner that the saw blade blank performs the movements necessary for the machining whilst the machining mechanism stands still. The tool can be of an arbitrary nature, for instance, a grinding wheel, a file tool or the like.

What is claimed is:

1. A device for manufacturing a saw blade from a blank in which the blank is adapted to be worked in a punch-like manner from both sides of the blank, said device comprising a chip-removing tool for forming the tooth gaps in the blade, said tool being movable transversely with respect to the longitudinal direction of the blank and with respect to the plane of the blade to engage the blank from both sides, said tool consisting of an edged member with a profile corresponding to the shape of the tooth gap to be formed and means for imparting to said tool during its successive reciprocating movements a feeding movement parallel to the blade plane and transversely to the longitudinal direction of the blank whereby the tool in moving in both transverse directions cuts out portions from the blank corresponding to a part of the tooth gap to be formed.

2. A device as defined in claim 1, wherein the tool is disposed in a holder adapted to oscillate about a center of rotation situated behind the saw tooth edge of the blank, the plane of rotation being perpendicular to the blade plane.

3. A device as defined in claim 1, further comprising backing members disposed on a feeding mechanism consisting of an arm rotatable in two planes and provided with a gripping member for the blank, said backing members being adapted to follow the feeding movement of the tool to orient the blank laterally and being provided with profiled grooves at right angles to the blade plane, said grooves having a shape conforming to the tooth gaps to be formed, said tool being adapted to run in said grooves during its reciprocating movement, the tool holder being pivotally carried on the backing members.

4. A device as defined in claim 3, wherein one of the movements of the feeding mechanism is carried out in the same direction as the feeding movement of the tool.

5. A device as defined in claim 4, further comprising an adjustable member for controlling the depth to which the tool advances into the blank, said member limiting the length of the gripping stroke of said arm.

6. A device as defined in claim 4, wherein the arm is actuated by two eccentrics, one acting for the gripping movement and the other acting for the feeding movement.

7. A device as defined in claim 1, wherein the tool is adapted to undergo a plurality of working movements for each tooth gap machined.

8. A device as defined in claim 1, further comprising a guide channel for the saw blade blank.

9. In a device as defined in claim 1, further comprising a setting tool synchronously connected to the device and means for actuating said setting tool to set said saw teeth during the intervals when the blank is standing still, said setting tool consisting of a reciprocable plate provided with punches disposed on each side of the blank and arranged in such a manner that they are situated each opposite a tooth during the intervals when the saw blade is standing still.

10. A device as defined in claim 9, wherein the gear ratio between the driving device and the cam shaft is such that the setting tool is actuated when the feeding of every third tooth is completed.

References Cited in the file of this patent

UNITED STATES PATENTS

| | | |
|---|---|---|
| 1,296,110 | Okey | Mar. 4, 1919 |
| 1,968,352 | Poeggel | July 31, 1934 |
| 2,510,462 | Christenson | June 6, 1950 |
| 2,514,567 | Daggett | July 11, 1950 |